United States Patent [19]

Winston

[11] Patent Number: 5,320,758

[45] Date of Patent: Jun. 14, 1994

[54] METHOD OF RECYCLING AMINE SAPONIFIERS USED IN CLEANING ELECTRONIC CIRCUIT BOARDS

[75] Inventor: Anthony E. Winston, East Brunswick, N.J.

[73] Assignee: Church & Dwight Co., Inc., Princeton, N.J.

[21] Appl. No.: 85,007

[22] Filed: Jun. 29, 1993

[51] Int. Cl.$^5$ .................. C02F 1/52; C02F 1/28
[52] U.S. Cl. .................... 210/702; 210/712; 210/908; 210/805; 134/40; 134/42
[58] Field of Search .............. 134/40, 41, 42; 210/702, 712, 724, 908, 909, 910, 667, 669, 687, 928, 900, 790, 805, 806

[56] References Cited

U.S. PATENT DOCUMENTS

| | | | |
|---|---|---|---|
| 3,492,159 | 1/1970 | Nowlin | 134/10 |
| 3,886,099 | 5/1975 | Hall | 134/42 |
| 3,954,403 | 5/1976 | Ferraro | 210/702 |
| 4,028,135 | 6/1977 | Vig et al. | 134/40 |
| 4,043,908 | 8/1977 | Roberts et al. | 210/724 |
| 4,216,084 | 8/1980 | Ikari et al. | 210/32 |
| 4,276,186 | 6/1981 | Bakos et al. | 252/158 |
| 4,378,296 | 3/1983 | Carlson, Jr. et al. | 210/774 |
| 4,403,949 | 9/1983 | March et al. | 432/147 |
| 4,409,119 | 10/1983 | Burger et al. | 252/156 |
| 4,566,912 | 1/1986 | Borg | 134/13 |
| 4,640,719 | 2/1987 | Hayes et al. | 134/42 |
| 4,676,908 | 6/1987 | Ciepiela et al. | 210/638 |
| 5,030,293 | 7/1991 | Rich et al. | 134/32 |
| 5,045,117 | 9/1991 | Witherell | 134/21 |
| 5,090,431 | 2/1992 | Theroux et al. | 134/182 |
| 5,108,617 | 4/1992 | Eriksson et al. | 210/679 |
| 5,114,592 | 5/1992 | Schuster et al. | 210/667 |
| 5,232,460 | 8/1993 | Botz | 210/712 |
| 5,264,046 | 11/1993 | Winston et al. | 134/42 |
| 5,269,850 | 12/1993 | Jackson | 134/40 |

*Primary Examiner*—Cynthia L. Nessler
*Attorney, Agent, or Firm*—Charles B. Barris

[57] ABSTRACT

The aqueous effluent from the wash and/or rinse cycles of a process for cleaning electronic circuit assemblies of rosin flux and other organic residues with an aqueous amine cleaning solution comprises treating the effluent with an alkaline earth metal oxide which reacts with the rosin flux to cause precipitation of an alkaline earth metal rosinate and the retention of free amine in aqueous solution.

20 Claims, No Drawings

METHOD OF RECYCLING AMINE SAPONIFIERS USED IN CLEANING ELECTRONIC CIRCUIT BOARDS

FIELD OF THE INVENTION

The present invention relates to a method of treating effluents derived from aqueous amine wash solutions which have been used during the cleaning of electronic circuit assemblies. Thus, aqueous amine wash effluents which contain amine-rosin flux residues, metals and organic adjuvants to the cleaning solution are treated to precipitate the rosin flux, metals and other contaminants washed from the electronic circuit assemblies and regenerate the aqueous amine cleaning solution which can be recycled to the wash cycle of the cleaning process.

BACKGROUND OF THE INVENTION

The cleanliness of electronic circuit assemblies (ECA), such as printed circuit boards (PCB) or printed wiring boards (PWB), is generally regarded as being critical to their functional reliability. Ionic and nonionic contamination on circuit assemblies is believed to contribute to premature failures of the circuit assemblies by allowing short circuits to develop.

In the manufacture of electronic circuit assemblies, ionic and nonionic contamination can accumulate after one or more steps of the process. Circuit assembly materials are plated, etched, handled by operators in assembly, coated with corrosive or potentially corrosive fluxes and finally soldered.

In the fabrication of electronic circuit assemblies, e.g., printed circuit boards, soldering fluxes are first applied to the substrate board material to ensure firm, uniform bonding of the solder. These soldering fluxes fall into two broad categories: rosin and non-rosin, or water soluble, fluxes. The rosin fluxes, which are generally only moderately corrosive and have a much longer history of use, are still widely used throughout the electronics industry. The water soluble fluxes, which are a more recent development, are being used increasingly in consumer products applications. Because water soluble fluxes contain strong acids and/or amine hydrohalides, such fluxes are very corrosive. Unfortunately, residues of any flux can cause circuit failure if residual traces of the material are not carefully removed following soldering and thus remain on an electronic circuit assembly.

The complete removal of adhesive and other residues from the electronic circuit assemblies also pose a problem. During the manufacture of electronic circuit assemblies the components are mounted on the upper surface of the board with leads protruding downwardly through holes in the board and are secured to the bottom surface of the board by means of an adhesive. Further, it is sometimes necessary to temporarily protect certain portions of the board from processing steps such as the process of creating corrosion resistant gold connecting tabs at the board edges. This transient protection of portions of the circuit board can be achieved by the application of special adhesive tape to susceptible areas. Once such protection is no longer needed, the adhesive tape must be removed. In both instances, a residue of adhesive generally remains which, if not thoroughly removed, can cause premature board failure. Removal of this adhesive residue has traditionally been carried out by the use of chlorinated solvents which are toxic and environmentally undesirable.

Thus, the residual contaminants which are likely to be found on electronic circuit assemblies and which must be removed include, but are not limited to, for example, rosin flux, photoresist, solder masks, adhesives, machine oils, greases, silicones, lanolin, mold release, polyglycols and plasticizers.

While water soluble fluxes can be easily removed with warm, soapy water, the removal of rosin flux and adhesive residues and the like from printed circuit boards is more difficult and has therefore traditionally been carried out with the use of chlorinated hydrocarbon solvents such as 1,1,1,-trichlorethane, trichloroethylene, trichloromonofluoromethane, methylene chloride, trichlorotrifluoroethane (CFC113), tetrachlorodifluoroethane (CFC112) or mixtures or azeotropes of these and/or other solvents. These solvents are undesirable, however, because they are toxic and when released into the environment deplete the ozone layer and/or contribute to the greenhouse global warming effect. Thus, use of such solvents is subject to close scrutiny by the Occupational Safety and Health Administration (OSHA) and the Environmental Protection Agency (EPA) and stringent containment equipment must be used. Moreover, if released into the environment these solvents are not readily biodegradable and are thus hazardous for long periods of time.

Alkaline cleaning compounds known as the alkanolamines, usually in the form of monoethanolamine, have been used for rosin flux removal as an alternative to the toxic chlorinated hydrocarbon solvents. These high pH compounds (e.g., about 12 pH), chemically react with rosin flux to form a rosin soap through the process of saponification. Unfortunately, these compounds, as well as the water soluble soldering fluxes, have a tendency to cause corrosion on the surfaces and interfaces of printed wiring boards if such compounds and fluxes are not completely and rapidly removed during the fabrication process.

For example, U.S. Pat. No. 3,886,099 discloses a water soluble aqueous amine cleaner to remove rosin flux from electronic circuit assemblies. The cleaner includes an aqueous solution of an aliphatic amine which reacts with the rosin flux to form a soap, a glycol ether used as a flux solvent and an organic acid which serves as a buffer to reduce and maintain the alkalinity of the solution at a pH of between about 10.5 and 11.0. While the patent states that the wash water may be discharged into a normal sewage system because the components are biodegradable, it is unlikely that at the present time the introduction of organics such as rosin fluxes, amines, glycol ethers and acids would be acceptable additions to the environment. In particular, in the disposal of industrial cleaning solutions, municipalities often mandate levels of impurities which are allowable in sewage effluents. Thus, the regulations frequently mandate maximum permitted pH, maximum allowable heavy metals and maximum allowable organics measured as BOD or COD. Accordingly, sewering the effluents from a process for cleaning electronic circuit assemblies with an aqueous amine solution would not be permissible.

On the other hand, treating the wash effluents obtained from the washing of electronic circuit assemblies with aqueous amine solutions by conventional activated carbon treatment and cation exchange would likely capture the amine which is reacted with the rosin to form a soap. The wash water effluent after treatment would include the glycol ethers which would likely pass through the carbon treatment. The amine therefore would have to be continuously replenished if the effluent is to be recycled to the wash cycle of the cleaning process. Likewise, even after carbon and ion exchange treatment, the aqueous effluent would still contain the glycol ether which could not likely be sewered for the reasons stated above.

Accordingly, a treatment process is needed to remove the contaminants from the wash water effluents obtained during the washing of electronic circuit assemblies with aqueous amine solutions so as to provide sufficient removal of the contaminants washed from the electronic circuit assemblies and to retain the active components of the aqueous amine cleaning solution in the effluent, such that the treated effluent can be recycled to the cleaning process without the need for substantial replenishment of the active ingredients to the cleaning solution.

SUMMARY OF THE INVENTION

In accordance with the present invention, the aqueous effluent from the wash and/or rinse cycles of a process for cleaning electronic circuit assemblies using an aqueous amine cleaning solution is treated to precipitate rosin flux, metals and other residual contaminants washed from the electronic circuit assemblies and, at the same time, regenerate the aqueous amine cleaning solution so as to retain the amine and other organic active ingredients of the cleaning solution in the wash effluent. The treated effluent can be recycled to the wash cycle of the electronic circuit assembly cleaning process and requires only minimal replenishment of cleaning additives.

The aqueous effluents which are contaminated with the residuals washed from the electronic circuit assemblies can be treated by the addition of an alkaline earth metal oxide in the form of a solid, aqueous solution or suspension thereof. The alkaline earth metal cation reacts with the amine-rosin flux soap to break the soap and form an alkaline earth metal salt of the rosin flux which is primarily abietic acid and which is precipitated as the alkaline earth metal rosinate. The heavy metals such as tin and lead are typically coordinated with the rosin flux and are entrapped within the precipitated alkaline earth metal rosinate and removed from the aqueous effluent. The amine-rosin soap is broken by the substitution of the alkaline earth metal cation for the amine and the amine is regenerated in solution. The low molecular weight organic adjuvants such as ethylene glycol or other low molecular weight oxygenated solvents remain in solution in the aqueous effluent. The aqueous effluent, now regenerated and containing the amine, oxygenated solvent and any other low molecular weight organic adjuvant can be reused as the wash solution. If needed, the aqueous effluent subsequent to the addition of the alkaline earth metal oxide may be subjected to carbon absorption and ion exchange to remove any heavier organics and metal ions which are not precipitated or carried from the solution by the precipitating insoluble alkaline earth metal salts.

DETAILED DESCRIPTION OF THE INVENTION

The aqueous flux remover useful in the present invention is effective in dissolving, saponifying, emulsifying and suspending a rosin flux in an aqueous solution so that it is prevented from redepositing. The components of the solution and the resulting reactants are all water soluble enabling easy water rinsing of the boards. The cleaning solution does not remove identifying code bands on components or other markings and is noninjurious to the metals or components usually used in the electronics industry.

The cleaning solution comprises a composition including a saturated aliphatic amine, a glycol ether, and optional adjuvants including a surfactant, anti-corrosion agent, and stabilizer to maintain the adjuvants in aqueous solution. A particular aqueous amine cleaning solution is disclosed in aforementioned U.S. Pat. No. 3,886,099 which is herein incorporated by reference.

Suitable amines are those which will react with the rosin flux and include the saturated aliphatic amines such as triethanol amine, diethanol amine, monoethanol amine, morpholine and the like. The amine reacts with the rosin flux and makes a water soluble soap with the flux to facilitate its removal. In addition, the amine may function as a corrosion inhibitor and a brightener of certain metals.

The glycol ether used in the cleaning compositions of the invention is present to act as a solvent for the rosin flux. In addition, it serves as a coupling agent and a foam depressant. Suitable glycol ethers include ethylene glycol mono methyl ether, ethylene glycol ethyl ether, ethylene glycol mono butyl ether, diethylene glycol mono ethyl ether, and diethylene glycol mono butyl ether and mixtures thereof. In addition, lower alcohols such as methylalcohol, ethyl alcohol, isopropyl alcohol and the like may be added as flux solvents used to serve as coupling agents.

A surfactant is preferably added to the cleaning solution to lower the surface tension of the solution and facilitate penetration of solvent into the flux. The surfactant also helps to emulsify and suspend the flux in solution and thereby aids in rising of the solution and dissolved materials from the circuit board. Suitable surfactants include polyoxyethylene surfactants such as alkylaryl polyether alcohol, modified polyethoxylated alcohol and the ethoxylates of some isomeric linear alcohols. Other of the conventional surfactants can also be used.

An organic acid can be added to serve as a buffer to reduce and maintain the alkalinity of the solution at a pH of between about 10.5 and 11.0. The acid preferably is selected so as to have the chelating ability thus to sequester oxides or metals present in the flux. The organic acids are selected from the non-volatile organic acids having chelating abilities such as citric acid, gluconic acid and hydroxyacetic acid.

The flux removing compositions may also contain one or more corrosion inhibitors to prevent corrosion or pitting of the connecting tabs or solder joints, metals or other materials present on the circuit boards being cleaned. The corrosion inhibitor is preferably an alkali metal silicate salt with the sodium and potassium silicate salts being most preferred. While the ratio of the two oxides can vary, most useful alkali metal silicates will have an $M_2O$ to $SiO_2$ mole ratio of between 1:0.5 to 1:4.5 wherein M represents the alkali metal. The silicates also provide additional alkalinity to the wash water to help cleaning. The addition of silicate actually promotes the brightness and shininess of the solder joints. For sufficient corrosion protection, it is useful to add 0.1 to 20 wt. % of the silicate corrosion inhibitor based on the amount of cleaning composition (without water).

At pH below 13 and, in particular, below 12, it has been found that the silicate precipitates from aqueous solutions. The silicates can be stabilized and kept in aqueous solution by the addition of an anionic polymer to the composition. Particularly preferred are anionic polymers containing carboxylate groups.

In general, anionic homopolymers or copolymers with molecular weights between about 1,000 to about 5,000,000 or mixtures thereof are usefully employed as silicate stabilizers. The following anionic polymers are non-inclusive examples of those suitable for stabilizing silicate solutions: carboxymethylcellulose, polyacrylic acid, polymethacrylic acid, polymaleic acid, polyglycolic acid, heteròpolymers of acrylic and methacrylic acid, xanthan gum, carrageenan gum and alginate gum. In the alkaline cleaning solutions, the anionic polymers are essentially present in the form of the sodium or potassium salts thereof.

For the removal of rosin soldering flux deposits, adhesives and the other residues during printed circuit/wiring board fabrication, the aqueous amine compositions are applied to the boards by immersion in dip tanks or by hand or mechanical brushing. Alternatively, the cleaning solutions can be applied by any of the commercially available printed wiring board cleaning equipment. Dishwasher size units may be employed, or much larger cleaning systems such as the "Poly-Clean +" and the various "Hydro-Station" models produced by Hollis Automation, Inc. of Nashua, N.H.

The temperature at which the flux removing compositions are applied typically range from room, or ambient, temperature (about 70° F.) to about 180° F., preferably, about 140° to 170° F.

Once the solder flux has been loosened and removed during a period of contact which typically ranges from about 1 to about 5 minutes, but may be longer up to about 10 minutes, the boards are taken from the flux removing solution. Another advantage of the aqueous cleaning solutions is that these flux removing solutions need not be flushed with organic solvents. The boards are simply flushed with water for a period of up to about 2 minutes. Deionized water is preferred. The optimal rinsing time varies according to the kinds of surfactants and the concentrations of the flux removing solutions used and can easily be determined by routine experimentation.

Washed off of the electronic circuit assemblies and carried into the wash and rinse water during the cleaning process are primarily the rosin fluxes, solder, as well as any residues of adhesive which remain on the assemblies. Also, removed are photoresist, solder mask, machine oils, greases, silicones, lanolin, mold release agents, polyglycols and plasticizers, etc. The aqueous wash and rinse effluents contain the rosin flux in the form of amine-rosin soaps as well as the oxygenated solvent, surfactant and other adjuvants. To reuse the aqueous phase of the wash and/or rinse effluents from the electronic circuit assembly cleaning process, it is necessary to remove the contaminants which are cleaned from the electronic circuit assemblies. It is important, however, to retain at least the amine and oxygenated solvent in the effluents such that recycle of these effluents to the cleaning process does not require substantial replenishment of the primary active ingredients of the aqueous cleaner. Moreover, governmental mandates require that aqueous effluents which are sewered must have a minimum level of cleanliness as exemplified by standards for pH, metal content and BOD and/or COD levels such that sewering the effluent which contains even a portion of the amine and oxygenated solvent is not practical. Table 1 sets forth the chemical characteristics of an aqueous wash effluent from an ECA cleaning process using an aqueous amine cleaner as previously described.

TABLE 1

| Wash Effluent from ECA Cleaning Process Using Aqueous Amine Cleaner | | |
|---|---|---|
| | Average | Range |
| pH | 11.0 | 10.0–12.5 |
| Specific gravity | 1.0 | 0.95–1.1 |
| Non-volatile solids | 0.2% | 0.05–0.5% |
| Hardness | 0 ppm | 0.0–10 ppm |
| Lead | 2 ppm | 0.2–10 ppm |
| Other heavy metals | 10 ppm | 0.2–25 ppm |
| Alkalinity as $CaCO_3$ | 20,000 ppm | 5,000–50,000 ppm |
| COD | 100,000 ppm | 20,000–100,000 ppm |
| Neutral Solvent | 20,000 ppm | 5,000–20,000 ppm |

The treatment of the wash and/or rinse water effluents from the electronic circuit assembly cleaning process for recycle thereto is achieved by precipitating the contaminants from the water phase. The precipitation is achieved by chemical treatment with an alkaline earth metal oxide which reacts with the contaminants to form insoluble salts. Importantly, the amine-rosin soap is broken and replaced with a water-insoluble alkaline earth metal rosinate which precipitates from solution and frees the amine which remains in solution.

In the process for treating the aqueous effluents from the process for cleaning electronic circuit assemblies, the wash and/or rinse cycle effluents are treated by the addition of an alkaline earth metal oxide, in particular, calcium or magnesium oxide. Calcium oxide is preferred. Other oxides of divalent metals may be used including barium oxide, zinc oxide, etc. The nonsoluble oxide can be added simply as a solid or in an aqueous suspension thereof to the effluent in a batch process in which the effluent is decanted and/or filtered to remove the solids. Such treatment requires only a small amount of oxide reactant, e.g., 0.02–1.0 pound of oxide per 100 gallons of waste water being treated. Alternatively, the effluents may be passed continuously one or more times through a bed of the oxide solids. A large bed, e.g., 100 pounds of oxide could, thus, be used to treat many bath loads of waste water with occasional additions of fresh oxide. The alkaline earth metal oxide can be used to treat the contaminated cleaning effluents at the operating temperature of the cleaning solution or at room temperature, whichever is more convenient.

For example, specifically referring to the treatment with an alkaline earth metal oxide and, in particular, calcium oxide, the cleaning effluents can be treated in batch by the addition of the oxide to the bath or the effluents can be passed through a bed of the calcium oxide present in particulate form. The calcium oxide reacts with the amine-rosin flux soap to form the calcium rosinate which essentially is the calcium salt of abletic acid. The calcium cation, thus, replaces the amine to break the amine soap and free the amine which remains in solution. The calcium rosinate is insoluble and precipitates from the solution. Heavy metals such as tin and lead are believed to be coordinated or otherwise tied to the rosin flux and will precipitate with the calcium rosinate. The oxygenated flux solvents do not react and remain in solution. Additionally, any silicate corrosion inhibitor and the organic adjuvants present in the cleaning solution, in particular, an anionic polymer to maintain the solubility of the silicate corrosion inhibitor will also be precipitated as the calcium silicate and calcium acid salt, respectively. During the precipitation process, the other organic materials such as surfactant and as well the metals contained in the effluent are entrapped within the precipitating compounds and are also essentially removed from the solution.

The inventive method can be readily integrated into the conventional cleaning equipment for the electronic circuit assemblies such as previously described by continuously withdrawing a certain partial flow from the wash or rinse solution which is to be treated, and is contained, for example, in a cleaning bath. The specific alkaline earth metal oxide is contacted with this partial flow either directly in solid form or in the form of an aqueous solution or suspension. After an appropriate reaction time, the resulting insolubles precipitate, such as solid calcium rosinate and are continuously removed by conveying the partial flow through a suitable filter system. The partial flow freed from the insoluble precipitates is conveyed back into the bath. Instead of withdrawing a partial flow, the entire wash or rinse solution can also be drawn off from the bath into a container after termination of operation, and can then be treated with the specific alkaline earth metal oxide. After a certain reaction time, the wash solution can be freed from the precipitating solid salts, and can be returned to the bath prior to the start of the next operation.

The treated aqueous effluents now freed from the precipitated rosin fluxes, metals and other organics can be recycled to the cleaning process as described above or may be further treated to insure complete removal of contaminants. Thus, the aqueous effluents now freed from the highly concentrated contaminants can be directed to a carbon bed to remove traces of organic material. The oxygenated flux solvents such as the glycol ethers are of low molecular weight and will not be absorbed and remain in the recycled effluent. Traces of metals and other ions can be removed by ion exchange. Additionally, the treated effluents can be further treated and directed to the effluent treatment process as disclosed in copending, commonly assigned U.S. patent application Ser. No. 08/085,005, filed Jun. 29, 1993 wherein the ECA cleaning effluents are subjected to carbon bed absorption, cation exchange, and aeration to remove dissolved gases. Additional treatments include UV light treatment to kill microorganisms, passage through a mixed bed of ion exchange resin to remove the traces of any cations and anions which may be present and/or reverse osmosis through semipermeable membranes.

The effluents can now be used as the wash to remove the contaminants from the electronic circuit assemblies. Replenishment of surfactant and other heavier organic adjuvants to the cleaning solution may be necessary. The amine and oxygenated flux solvent may have to be replenished periodically, but will be retained primarily at full concentrations through the effluent-treatment process.

EXAMPLE

A wash effluent from an ECA cleaning process using a cleaning solution comprising monoethanolamine and ethylene glycol monobutylether is treated with calcium oxide in accordance with the process of this invention. Thus, the aqueous wash effluent such as characterized in Table 1 above and at a temperature of about 140° F. is passed through a 100 pound fixed bed of calcium oxide at an approximate flow rate of 1 gallon per minute. The effluent issuing from the bed is filtered to remove precipitated solids. The effluent so treated has the chemical characteristics as set forth in Table 2 below.

TABLE 2

| Wash Effluent Subsequent to CaO Treatment | | |
|---|---|---|
| | Typical | Range |
| pH | 11.5 | 10.0–12.5 |
| Specific gravity | 1.0 | 0.95–1.1 |
| Non-volatile solids | 0.0% | 0.00–0.01% |
| Hardness | 0 ppm | 0.0–10 ppm |
| Lead | <0.2 ppm | 0.0–0.2 ppm |
| Other heavy metals | <1 ppm | 0.0–0.2 ppm |
| Alkalinity as $CaCO_3$ | 22,000 ppm | 5,000–50,000 ppm |
| COD | 100,000 ppm | 20,000–100,000 ppm |
| Neutral Solvent | 20,000 ppm | 5,000–20,000 ppm |

As can be seen, the treatment with calcium oxide removes nonvolatile solids and heavy metals which are residues from the circuit boards and raises the pH slightly to about 11.5. The alkalinity is also slightly raised due to the conversion of the monoethanol amine salts to free monoethanol amine but the neutral ether solvent is unaffected by the treatment. This treated effluent can be returned to the wash bath where it can be reused for cleaning the electronic circuit assemblies.

What is claimed is:

1. A process for treating aqueous cleaning effluent derived from either a wash cycle, a rinse cycle, or both, of a process for cleaning electronic circuit assemblies with an aqueous amine cleaning solution, said effluent containing an amine-rosin flux soap, comprising treating said effluent with an alkaline earth metal oxide in amounts sufficient to cause reaction of the alkaline earth metal oxide with said amine-rosin flux soap and cause precipitation of an alkaline earth rosinate from said effluent and the retention of free amine in aqueous solution.

2. The process of claim 1 wherein said alkaline earth metal oxide comprises a calcium or magnesium oxide.

3. The process of claim 1 wherein said aqueous cleaning effluent further contains alkali metal silicates originally present in said cleaning solution and wherein said alkaline earth metal oxide reacts with said silicates to form an alkaline earth metal silicate which is insoluble in water.

4. The process of claim 1 wherein said aqueous cleaning effluent further contains carboxylated organic adjuvants originally present in said cleaning solution and said alkaline earth metal oxide reacts with said carboxylates to form water insoluble alkaline earth metal salts thereof.

5. The process of claim 1 wherein both the effluents from said wash and rinse cycles are treated with said alkaline earth metal oxide.

6. The process of claim 1 wherein said effluent is passed in contact with a bed of solid alkaline earth metal oxide to effect said treatment.

7. The process of claim 6 wherein said treatment is effected on a continuous basis.

8. The process of claim 1 wherein said oxide is added to said effluent as a solid or as a suspension in water.

9. The process of claim 8 wherein said oxide is calcium oxide.

10. The process of claim 8 wherein said treatment is effected in a batch reaction.

11. The process of claim 1 wherein said cleaning solution further contains an oxygenated flux solvent which does not react with said alkaline earth metal oxide and remains in aqueous solution.

12. The process of claim 11 wherein said oxygenated solvent is a glycol ether.

13. The process of claim 12 wherein said amine is an alkanol amine.

14. The process of claim 12 wherein said amine is monoethanol amine.

15. The process of claim 14 wherein said glycol ether is diethylene glycol monobutylether.

16. The process of claim 15 wherein said alkaline earth metal oxide is calcium oxide.

17. A process for treating an aqueous cleaning effluent containing an amine-contaminant soap which comprises treating said effluent with an alkaline earth metal oxide in amounts sufficient to cause reaction of the alkaline earth metal oxide with said amine-contaminant soap and cause precipitation of the product of said reaction from said effluent and the retention of free amine in aqueous solution, and recycling said aqueous solution containing said free amine to a wash cycle of a cleaning process.

18. The process of claim 17 wherein said amine is an alkanol amine.

19. The process of claim 17 wherein said oxide is calcium oxide.

20. The process of claim 19 wherein said cleaning effluent further contains an oxygenated solvent which does not react with said alkaline earth metal oxide and remains in aqueous solution.

* * * * *